United States Patent
Bienvenu (10) Patent No.: US 12,427,730 B2
(45) Date of Patent: Sep. 30, 2025

(54) TOOL AND METHOD FOR MOLDING A DUCT FOR AN AIRCRAFT TURBINE ENGINE

(71) Applicant: SAFRAN AIRCRAFT ENGINES, Paris (FR)

(72) Inventor: Steven Gérard Joseph Bienvenu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/720,806

(22) PCT Filed: Dec. 13, 2022

(86) PCT No.: PCT/FR2022/052328
§ 371 (c)(1),
(2) Date: Jun. 17, 2024

(87) PCT Pub. No.: WO2023/118690
PCT Pub. Date: Jun. 29, 2023

(65) Prior Publication Data
US 2025/0207512 A1   Jun. 26, 2025

(30) Foreign Application Priority Data

Dec. 21, 2021   (FR) ..................................... 2114054

(51) Int. Cl.
*B29C 70/42*    (2006.01)
*F01D 25/00*    (2006.01)
(Continued)

(52) U.S. Cl.
CPC .............. *F01D 25/24* (2013.01); *B29C 70/42* (2013.01); *F01D 25/005* (2013.01);
(Continued)

(58) Field of Classification Search
CPC .................. B26C 70/42; B26C 70/462; B29L 2031/7504
See application file for complete search history.

(56) References Cited

U.S. PATENT DOCUMENTS 3,549,444 A * 12/1970 Katz ..................... F04D 29/321
                                                        416/241 A
5,362,344 A * 11/1994 Ben-Porat ................ D04C 3/48
                                                        416/241 A
(Continued)

FOREIGN PATENT DOCUMENTS

CN   206937859 U   1/2018
FR   3 094 265 A1  10/2020

OTHER PUBLICATIONS

International Search Report mailed Mar. 29, 2023, issued in corresponding International Application No. PCT/FR2022/052328, filed Dec. 13, 2022, 5 pages.

(Continued)

*Primary Examiner* — Danielle M. Christensen
(74) *Attorney, Agent, or Firm* — CHRISTENSEN O'CONNOR JOHNSON KINDNESS PLLC (57) ABSTRACT

A tool is configured for molding a duct for an aircraft turbine engine, wherein the duct is made of a fiber-based composite material and includes a curved tubular portion, one end of which is connected to a peripheral flange. The tool has a base and a generally elongate and curved body. The body is formed by an assembly of first parts which are fitted tightly together and which include a first central release key which extends from one end of the body to the other and which is configured to be removed first upon release of the body.

10 Claims, 5 Drawing Sheets

(51) Int. Cl.
*F01D 25/24* (2006.01)
*B29L 31/00* (2006.01)
*B29L 31/30* (2006.01)

(52) U.S. Cl.
CPC ............... *B29L 2031/3076* (2013.01); *B29L 2031/7504* (2013.01); *F05D 2300/603* (2013.01)

(56) References Cited

U.S. PATENT DOCUMENTS

2013/0294924 A1    11/2013    Mathon et al.
2015/0354396 A1    12/2015    Leszczynski et al.
2021/0308967 A1*    10/2021    Thai ..................... B29C 33/405

OTHER PUBLICATIONS

Written Opinion mailed Mar. 29, 2023, issued in corresponding International Application No. PCT/FR2022/052328, filed Dec. 13, 2022, 6 pages.

* cited by examiner

TOOL AND METHOD FOR MOLDING A DUCT FOR AN AIRCRAFT TURBINE ENGINE

TECHNICAL FIELD OF THE INVENTION

This invention relates to a tool and a method for molding a duct for an aircraft turbine engine.

TECHNICAL BACKGROUND

The technical background comprises in particular the documents FR-A1-3 094 265, CN-U-206 937 859, US-A1-2013/294924 and US-A1-2015/354396.

In order to manufacture a composite material duct for an aircraft turbine engine, it is known to use a tool comprising a flexible membrane on which a dry fibrous preform is arranged, and an external mold, made up of several portions, which is placed around the dry fibrous preform.

The dry fibrous preform, made of carbon fiber and/or glass fiber, is arranged on the inflated flexible membrane, then the various portions of the mold are assembled around the membrane/preform assembly. Once the preform is placed in the tool, an internal surface of the preform lies against the flexible membrane and an external surface of the preform lies against the external mold.

The various portions of the tool are then held together. Once the assembly is attached, the tool is heated and polymerizable resin configured to impregnate and stiffen the preform is injected into the tool. The resin is injected into the preform using an injection piston, with a vacuum maintained at the level of the preform. Once the preform has been completely injected, the pistons cease to exert any pressure, and the tool continues to heat up to polymerize the resin. Once the heating cycle is complete, the part may be demolded. However, the prior art tool has a number of disadvantages.

In particular, in order to heat the assembly of the preform during the heating cycle, it is necessary to heat the assembly of the mold. The tool thus comprises a heating system integrated into the parts of the mold, in particular heating rods, i.e. resistors arranged in different places in the different portions of the mold. The presence of this heating system means that the mold has to be very large and heavy, making it difficult to handle.

In addition, as the mold is made of steel, its thermal inertia means that the resin does not have the correct thermal homogeneity during the temperature rise and polymerization phases. This inhomogeneity has a particular impact on the material health and functional requirements of the part. In particular, the inhomogeneity leads to a poor polymerization, i.e. in particular a glass transition temperature and a polymerization rate that are too low, which has a negative impact on the mechanical properties of the materials and reduces the mechanical characteristics of the part. This inhomogeneity may also lead to the formation of unwanted indications, such as delaminations (physical separation between the reinforcement folds, indicating a resin discontinuity at the interface), porosities, fiber pinches and/or geometric shifts resulting in a reduction in the mechanical characteristics of the finished part, in particular a poor fiber volume ratio which may lead to the finished part being scrapped.

In addition, the dry fibrous preform is relatively thick before compaction and injection, which makes it difficult to close the various portions of the external mold and leads to local pinching of fibers and variations in the geometry of the finished part beyond the tolerances imposed, which may prevent the finished part from being mounted to the turbine engine.

In addition, the flexible membrane does not allow a sufficient pressure to be applied in all areas of the preform. Pockets of resin without fiber reinforcement are created, creating mechanical abatement and reducing the mechanical characteristics and the service life of the finished part. An incorrect application of the pressure also generates high variations in fiber density, which is detrimental to the mechanical characteristic.

Also, the preforms made of composite material have a face that is compatible with the aerodynamic requirements when the latter is against a rigid mold, since the resin takes the exact shape of the mold. Conversely, a flexible membrane does not have a sufficient rigidity to ensure a controlled roughness and an absence of surface undulations, compatible with the aerodynamic requirements. For example, if the duct has an internal surface that will be subjected to an aerodynamic flow, its positioning against a flexible membrane during manufacture may cause the duct to be incompatible with the aerodynamic requirements, necessitating an operator intervention or the disposal of the duct.

On the other hand, the tool of the prior art is very bulky. The mold and its various portions are positioned on the outside of the preform. Given that the part to be produced may measure several tens of centimeters and that the tool also comprises the heating system, the dimensions of the tool may be up to one meter wide, one meter long and up to one meter high.

Moreover, the tool is very heavy. In addition, as each of the portions of the mold weighs a great deal, in particular more than 35 kg, it is necessary to use handling equipment to handle the various mold portions.

Also, because the tool of the prior art is massive, it is only possible to produce one part at a time.

Moreover, each mold may only produce one duct reference and one duct at a time. The multiplication of duct references and/or the requirements in terms of production rate therefore lead to a multiplication of the molds that need to be available.

Finally, once the preform has been cured, demolding the different portions of the mold is very complicated, particularly because of the draft angles and geometric peculiarities of the different parts.

In particular, the present invention is configured to solve in particular some or all of the above problems.

SUMMARY OF THE INVENTION

To this end, the invention proposes a tool for molding a duct for an aircraft turbine engine, the duct being made of a fiber-based composite material and comprising a curved tubular portion, one end of which is connected to a peripheral rim, this tool comprising:
- a basement which has a generally parallelepiped shape and an upper surface of which comprises a central recessed portion and a peripheral portion configured to be covered by at least one fiber lap to form the peripheral rim of the duct,
- a body of generally elongated and curved shape and comprising a longitudinal end removably fitted into the central portion of the basement, this body being configured so as to be covered by at least one lap of fibers for producing the tubular portion of the duct, this body being produced by an assembly of first parts which are mounted so as to fit against one another and which comprise a first central demolding key which extends from one end of the body to the other and which is configured so as to be removed first when the body is demolded.

The tool of the invention therefore dispenses with the need for a mold external to the duct, allowing a fiber lap to be positioned on the basement and the body on the one hand, and the body and the basement to be removed easily, thanks in particular to the first central demolding key and the removable fitting of the body into the basement. The invention thus allows to avoid the problems of the prior art associated with the aforementioned molds and in particular:

- the dimensional and shape constraints of the duct are respected because the tool is placed before the fiber lap is draped over the basement and the body, which avoids difficulties in closing the mold;
- the demolding is simpler because a single part, the first central key, allows to unlock all the other first parts in place;
- the damaged parts of the tool may be replaced individually;
- the tool has a much lower mass than the tool of the prior art, making it easier to handle;
- as the tool is inside the preform, it is possible to obtain a better thermal homogeneity when curing the preform, for example using an autoclave or an oven; and
- in particular, it is possible to fit several assemblies (tools and preform) into an autoclave, allowing several ducts to be produced simultaneously with the same heating cycle, thereby reducing manufacturing costs.

The tool, according to the invention, may comprise one or more of the characteristics below, taken alone with each other or in combination with each other:

- the basement is formed in one-part;
- the body comprises at least nine first parts which extend from one end of the body to the other, namely the first central key and eight first peripheral parts distributed around the first central key so that the nine first parts are arranged in three rows and three columns;
- the duct further comprising a bypass connected to the tubular portion, the tool further comprises an arm which projects from the body and which is configured so as to be covered by at least one fiber lap for producing the bypass;
- the arm is made by an assembly of second parts which extend from one end of the arm to the other; and
- the assembly of second parts comprises a second central demolding key configured to be removed first when the arm is demolded.

The invention also relates to a method for manufacturing a duct for an aircraft turbine engine by means of a tool, as described above, this method comprising the steps of:

a) assembling said assembly of first parts to form said body and fitting a longitudinal end of this body into the central portion of said basement,
b) affixing fiber laps to the body and to the peripheral portion of the basement,
c) polymerizing a resin impregnated or injected onto the fiber laps, and
d) demolding the duct, which comprises the sub-steps of:
   (i) dismantling and removing the basement from the body,
   (ii) removing the first central key from the body,
   (iii) removing the other first parts from the body.

The method, as described above, further comprises:
in step b), affixing fiber laps to the arm, and,
in step d), sub-steps of:
   j) removing the second central key from the arm and
   jj) removing the other second parts from this arm.

The method, as described above, further comprises:
in step c), compressing the fiber laps on the tool by means of a partial vacuum produced between the tool and a vacuum bag which covers the fiber laps and the tool.

The method, as described above, has the following characteristics:
the laps are made of carbon fiber and
the resin is an epoxy or bismaleimide resin.

BRIEF DESCRIPTION OF THE FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
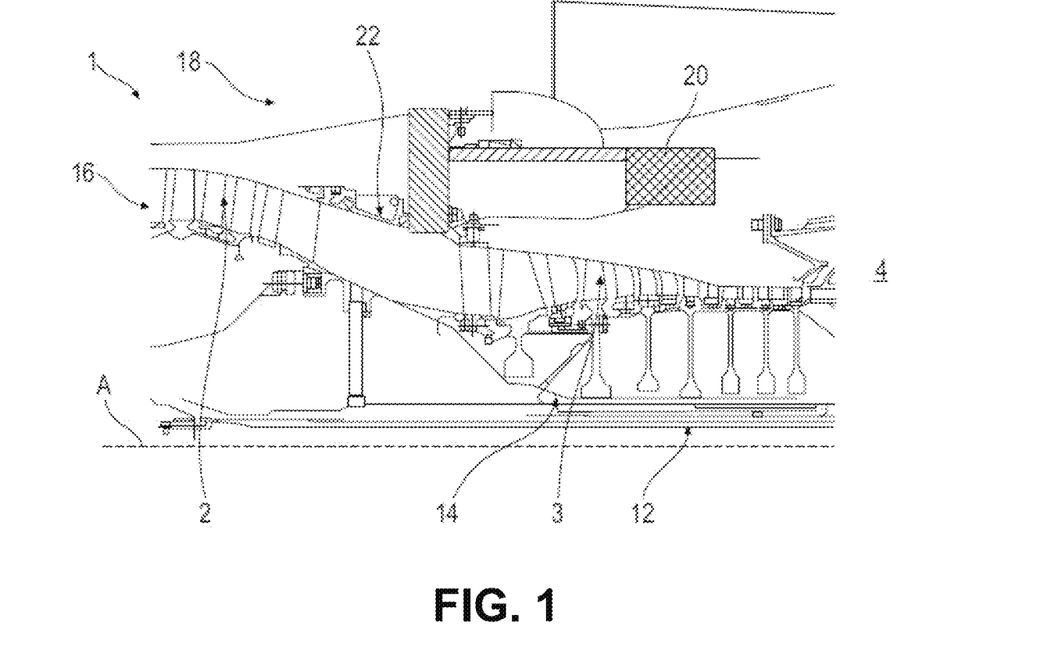
FIG. 1 is a schematic representation in axial cross-section of a turbofan engine according to the invention, the turbine engine comprising a variable discharge valve.

FIG. 1 shows a turbofan engine 1 configured to equip an aircraft. Such a turbine engine 1 generally comprises, from upstream to downstream in the direction of gas flow, one or more ducted fans, then a gas generator comprising one or more compressor stages, low pressure 2 then high pressure 3, a combustion chamber 4, one or more turbine stages, high pressure then low pressure, and a gas exhaust nozzle. The fan, the high- and low-pressure turbines and the nozzle are not shown in the figure for reasons of clarity.

The turbine engine 1 also comprises, moving away from its main axis A, a low-pressure shaft 12, a high-pressure shaft 14, a primary air flow vein 16 arranged inside the gas generator, a secondary air flow vein 18 extending around the gas generator, and a heat exchanger 20.

The fan or the fans are configured to generate a primary air flow in the primary vein 16, and a secondary air flow in the secondary vein 18.

Figure 2:
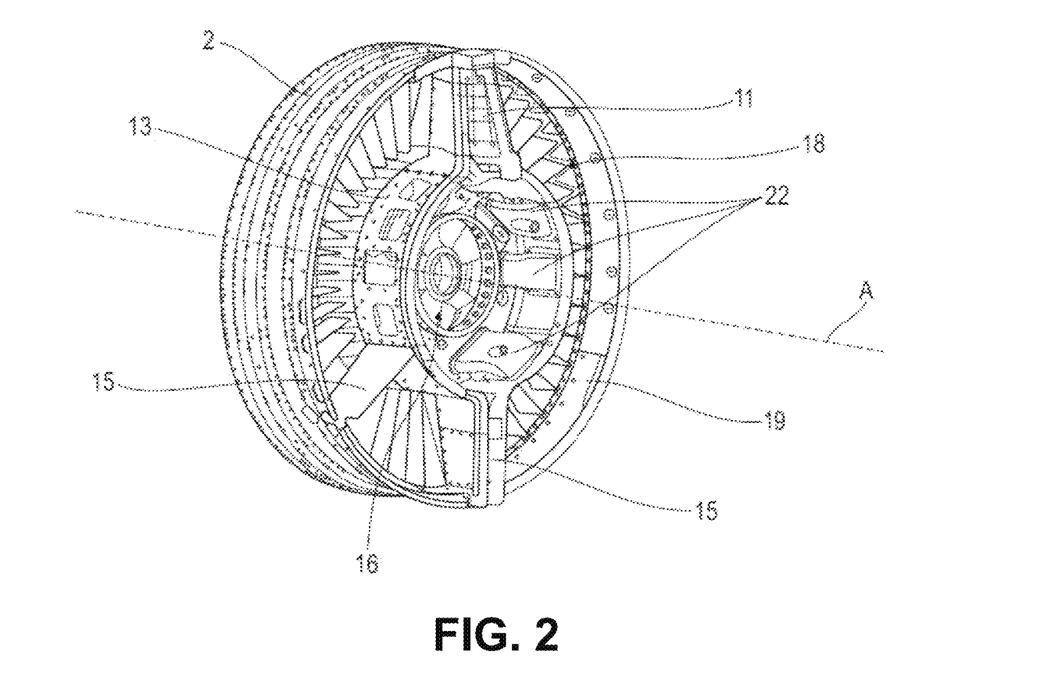
FIG. 2 is a schematic perspective view of a stage of a compressor of the turbine engine comprising a variable discharge valve.

As shown in FIG. 2, the turbine engine 1 comprises an intermediate casing 11, mounted between the low-pressure compressor 2 and the high-pressure compressor. The intermediate casing 11 comprises, for example, a hub 13, arms 15 located in particular at the level of the secondary vein 18, and a shell 19. The arms 15 connect the hub 13 to the shell 19.

The gas generator also comprises at least one duct 22. Three ducts 22 in particular may be seen in FIG. 2. The ducts 22 are located in particular inside the intermediate casing 11 of the turbine engine, for example at the level of the hub 13 and in particular in an inter-vein space, i.e., a space located between the primary vein 16 and the secondary vein 18. Said at least one duct 22 is in particular a discharge valve, in particular a variable discharge valve VDV 22. These are, for example, variable discharge valves for low-pressure compressor stages 2. Depending on the phases of flight and for reasons of operability, it is necessary to unload the low-pressure compressor 2, in other words to evacuate primary flow rate downstream of this compressor 2 towards the secondary vein 18. This discharge is achieved by a hatch, opened by the variable discharge valve or valves, which allows some of the air in the primary vein 16 to flow towards the secondary vein 18. Such variable discharge valves sometimes also act as a scoop for foreign bodies (such as hail or hailstones) before the high-pressure compressor 3. In the event of a fault, they may also be used to protect the secondary flow from a flame that could rise from the primary flow.

Figure 3:
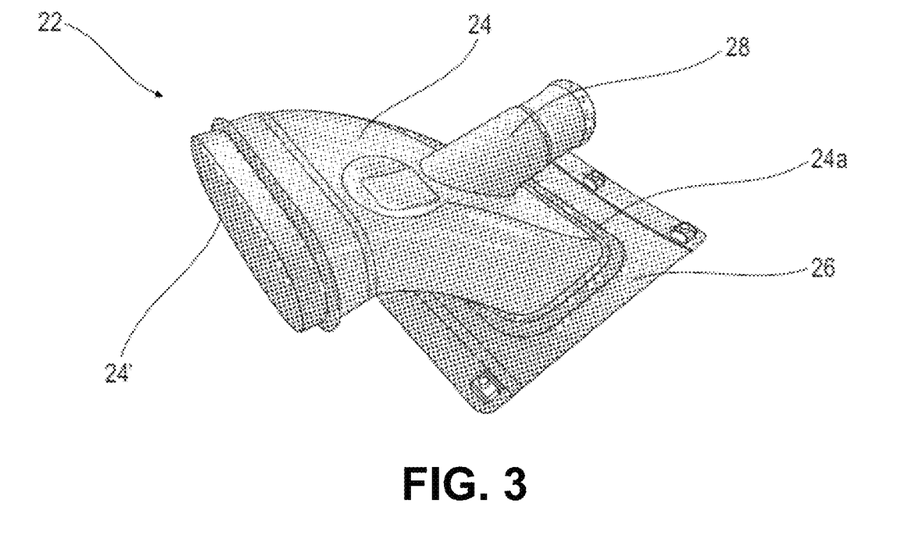
FIG. 3 is a schematic perspective view of a variable discharge valve.

Such a duct 22 is shown in perspective and in greater detail in FIG. 3. The duct 22 comprises a curved tubular portion 24, one end 24a of which is connected to a peripheral rim 26. The peripheral rim 26 is substantially rectangular in shape. The curved tubular portion 24 comprises an internal surface 24' which delimits the passage of air from the primary vein 16 towards the secondary vein 18 when the duct 22 is open. The duct 22 may also comprise a bypass 28, in particular a tubular bypass, connected to the tubular portion 24 of the duct 22. This bypass 28 also comprises an internal surface (not shown) which delimits a flow passage. In particular, the bypass 28 is configured to supply the heat exchanger 20.

Figure 4:
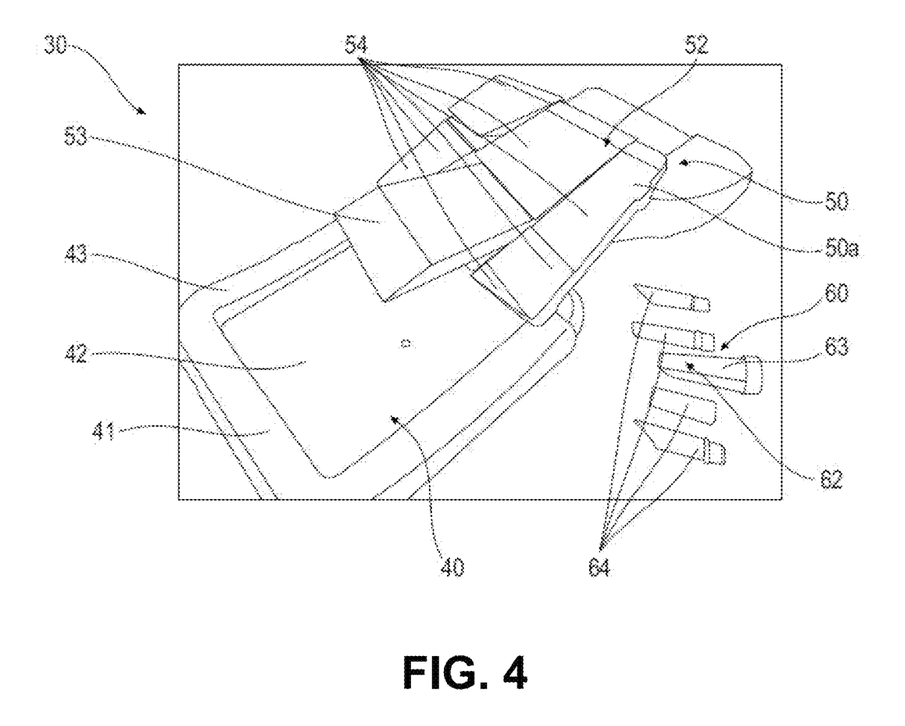
FIG. 4 is a schematic perspective representation of a tool according to the invention.
Figure 5:
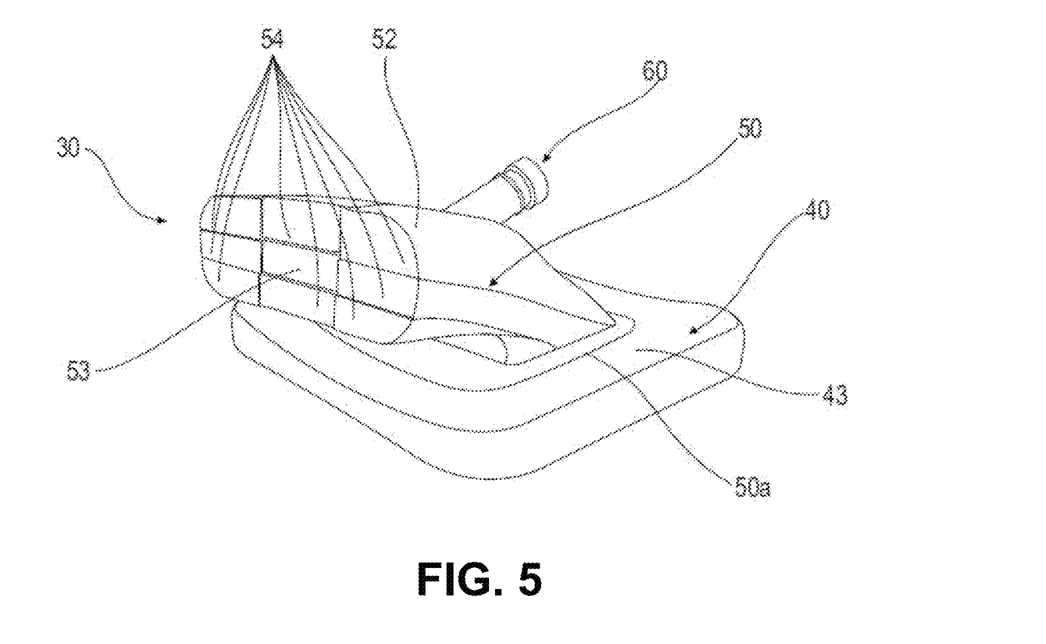
FIG. 5 is a schematic perspective view of the assembled tool.
Figure 6:
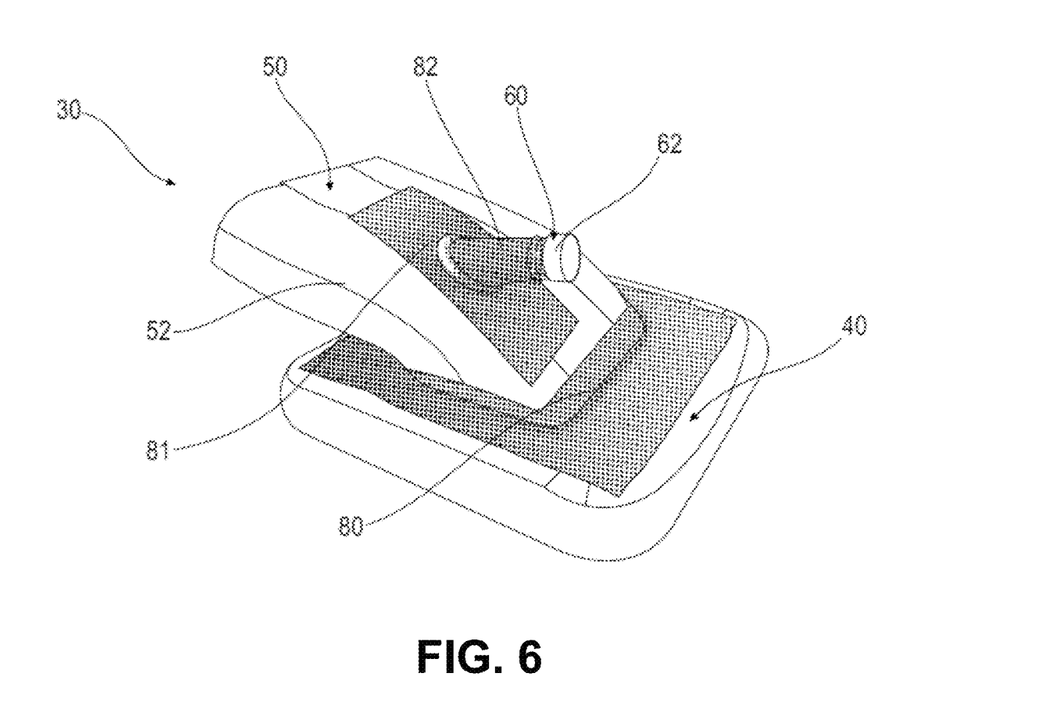
FIG. 6 is a schematic perspective representation of the start of draping a fiber lap over the assembled tool.

FIGS. 4, 5 and 6 show a molding tool 30 allowing to manufacture the duct 22 by molding. In particular, this tool comprises a basement 40 and a body 50.

The basement 40 is generally parallelepipedic in shape and comprises an upper surface 41. This upper surface 41 comprises a central portion 42 which is recessed and a peripheral portion 43. The peripheral portion 43 is configured to be covered by at least one lap of fibers 80 to form the peripheral rim 26 of the duct 22. The fiber lap 80 is draped over the basement 40, for example. In one embodiment of the invention, the basement 40 is formed in one-part.

The body 50 has a generally elongated and curved shape and comprises a longitudinal end 50a which is removably fitted into the central portion 42 of the basement 40, which is recessed to correspond to the longitudinal end 50a. The body 50 is configured to be covered by at least one lap of fibers 81 to form the tubular portion 24 of the duct 22. The fiber lap 81 is draped over the body 50, for example.

The fiber laps 80, 81, for example, are then injected with a polymerizable resin so as to form a preform made of composite material.

The body 50 is made up of an assembly of first parts 52 which are fitted tightly together. The body 50 comprises at least nine first parts 52. Each of the nine first parts 52 extends from one end of the body 50 to the other. These nine first parts 52 comprise a first central key 53 and eight first peripheral parts 54 distributed around the first central key 53 so that the nine parts 52 are arranged in three rows and three columns, as shown in FIG. 5. The first central key 53 is therefore in the second row and the second column. This first central demolding key 53 is configured to be removed first when the body 50 is demolded. When the composite material preform is polymerized, thus forming the duct 22, or before resin is injected into the fiber laps 80, 81, it is necessary to separate the body 50 from the central recessed portion 42 of the basement 40 and to remove the first central key 53, in particular in an extraction movement in a direction parallel to the longitudinal extension of the body 50. It is then easy to remove the first eight peripheral parts 54, in particular in an extraction movement in a direction parallel to the longitudinal extension of the body 50, to release the internal space of the curved tubular portion 24 of the duct 22. This makes the demolding of the duct 22 particularly easy, as a single part, the first central key 53, holds all the others in place.

The tool 30 also comprises an arm 60 which projects from the body 50 and is configured to be covered by at least one fiber lap 82 for producing the bypass 28. The fiber lap 82 is draped over the arm 60, for example. This arm 60 is made up of an assembly of second parts 62 which extend from one end of the arm 60 to the other. The assembly of second parts 62 comprises a second central demolding key 63 configured to be removed first when demolding the arm 60 and operating in a similar way to the first central key 53.

These second parts 62 comprise the second central key 63 and second peripheral parts 64, for example four second peripheral parts 64 arranged around the second central key 63. When the preform made of composite material is polymerized or before resin is injected into the fiber lap 82, the second central key 63 must be removed from the arm 60 so that the second peripheral parts 64 may then be easily removed and the internal space of the bypass 28 of the duct 22 is released.

The second central key 63 and then the second peripheral parts 64 are released in an extraction movement in a direction parallel to the longitudinal extension of the arm 60.

The second parts 62 are, for example, removably attached to the body 50, in particular at the level of one longitudinal end 62a of the second parts 62.

The duct 22 may thus be manufactured:
draping the fiber laps 80, 81, 82 over the basement 40, the body 50 and possibly the arm 60;
injecting a resin so as to form the preform made of composite material;
heating the preform so as to polymerize it and form the duct 22; and
removing the body 50 from the basement 40 and then from the duct 22 and possibly removing the arm 60 from the duct 22 as previously explained.

Alternatively, the resin may be injected and then heated after the tool 30 has been removed from the fiber laps 80, 81, 82.

Furthermore, in an embodiment where the fiber laps 80, 81, 82 are pre-impregnated with resin, the injection step is not necessary.

In particular, the basement 40, the body 50 and the arm 60 are rigid, making the tool 30 rigid. Thanks to this rigidity, the internal surface of the preform, i.e., the internal surface of the duct 22, which is against the body 50 and the arm 60, will thus be smooth and will have exactly the desired shape, thus avoiding in particular the aerodynamic problems of the prior art.

In addition, as the draping is carried out after the tool 30 (basement 40, body 50 and arm 60) has been assembled, the latter may not move during the molding of the duct 22, and the dimensional and shape constraints are respected. The tool 30 of the invention thus allows to control the final geometry of the duct 22 because its positioning inside the duct allows to guarantee the reproducibility of the shape of the duct 22.

In addition, the preform is cured, for example, using an oven or an autoclave (remote heating system). As a result, the tool 30 has a much lower mass than in the prior art. In addition, each first part 52 and/or second part 62 may be hollow, further reducing the weight and making handling much easier.

In addition, as the tool 30 is inside the preform, and the heating system is remote, the invention allows to ensure a better thermal homogeneity during manufacture of the duct 22. In addition, several tools 30 may be fed into an autoclave, allowing several ducts 22 to be manufactured simultaneously using the same heating cycle, thereby reducing the manufacturing times and costs. The tool 30 comprises between 10 and 18 parts, depending on the type of duct 22 to be manufactured, so any parts of the tool 30 that are damaged may be replaced individually.

The invention also relates to a method for manufacturing the duct 22 for the aircraft turbine engine 1, by means of a tool 30, as described above.

In particular, the method comprises a step a) consisting of assembling the assembly of first parts 52 to form the body 50 (FIG. 4). The longitudinal end 50*a* of this body 50 is then fitted into the central portion 42 of the basement 40 (FIG. 5).

The method comprises a step b) (FIG. 6) consisting of affixing the fiber laps 80, 81 to the body 50 and to the peripheral portion 43 of the basement 40. The method also comprises affixing the fiber laps 82 to the arm 60.

Figure 7:
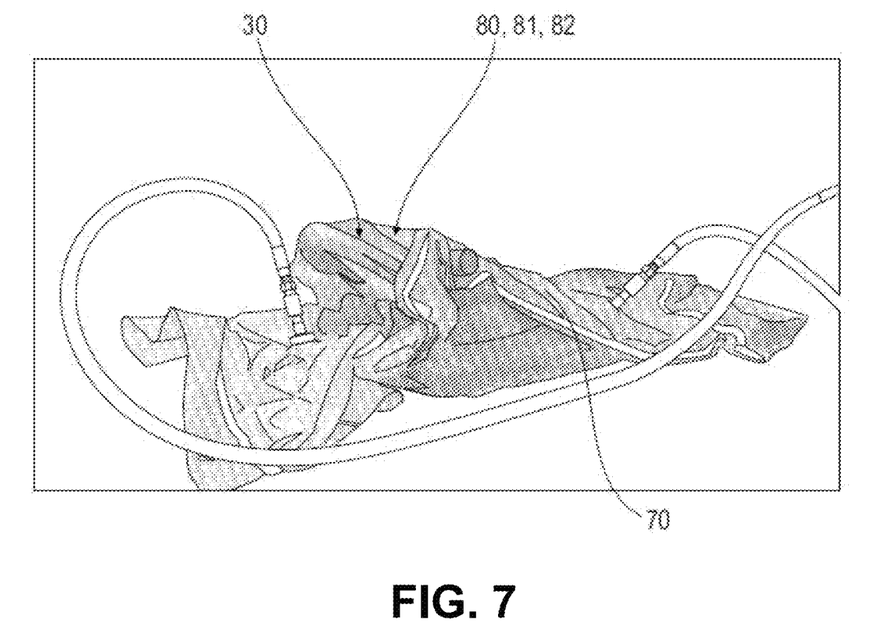
FIG. 7 is a schematic perspective view of the tool surrounded by a preform, vacuumed by a vacuum bag.

The method comprises in particular a step c) consisting of polymerizing a resin impregnated or injected onto the fiber laps 80, 81, 82. The method also comprises (FIG. 7) compressing the fiber laps 80, 81, 82 on the tool 30 using a partial vacuum. To create this partial vacuum, a vacuum bag 70 is arranged over the fiber laps 80, 81, 82 arranged on the tool 30. The partial vacuum is therefore created between the tool 30 and the vacuum bag 70.

Alternatively, a flexible membrane may be used instead of the vacuum bag 70. The flexible membrane may be made of thermoformed silicone. It may be heated independently.

The vacuum bag 70 and/or the flexible membrane are used to draw the vacuum and cure the preform made of composite materials.

Figure 8:
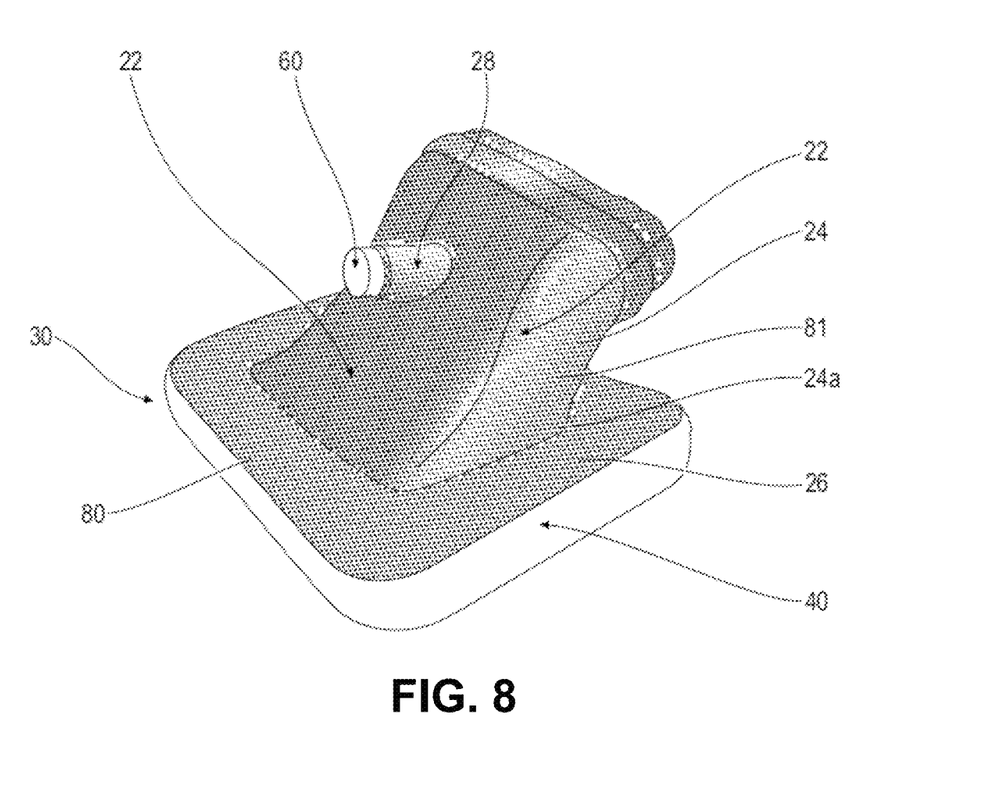
FIG. 8 is a schematic representation of a composite material preform for constructing a variable discharge valve, located on the tool.

The duct 22 is thus created (FIG. 8) and is a variable discharge valve.

The method comprises, for example, a step d) (FIG. 9) which consists of demolding the duct 22. At this step, the method comprises a sub-step i) consisting of dismantling and removing the basement 40 from the body 50. This sub-step is followed in particular by a sub-step ii) consisting of removing the first central key 53 from the body 50. The central key 53 must be removed first in order to unlock all the other first eight parts 54. The first central key 53 has a particular geometry which allows it to be removed from the other eight first parts 54 without difficulty, using draft angles for example. The central key 53 is extracted, for example, in a direction parallel to the longitudinal extension of the body 50.

Figure 9:
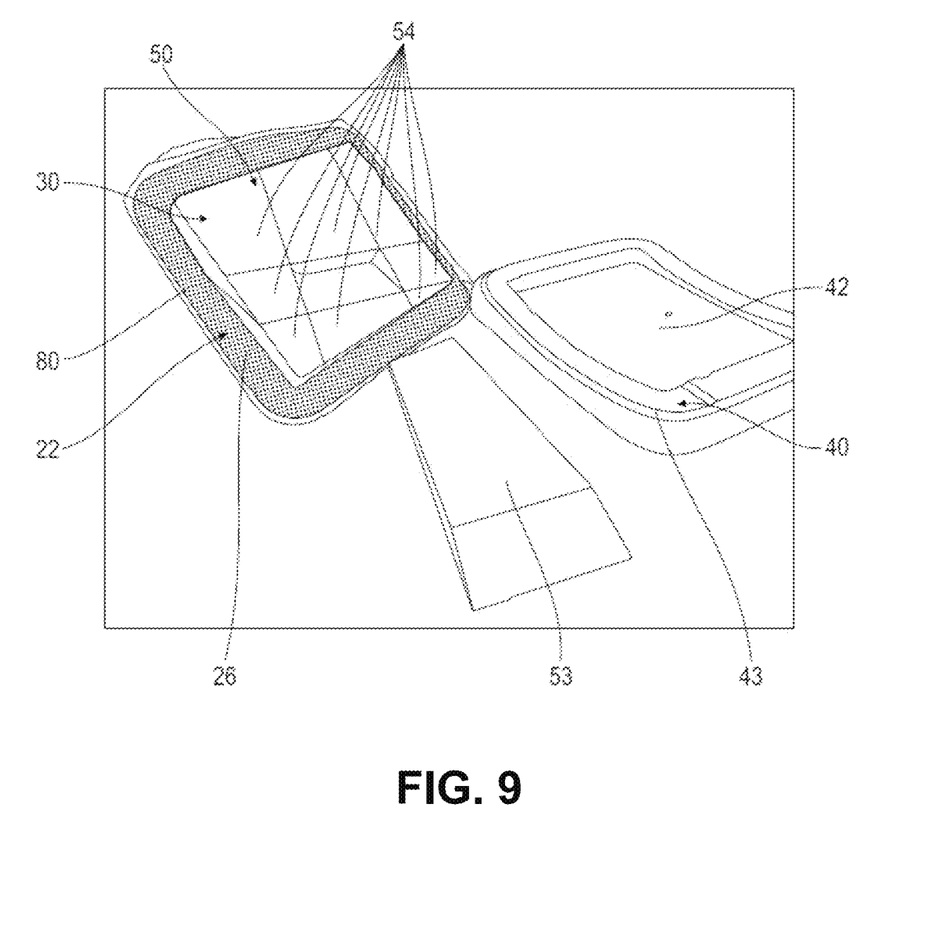
FIG. 9 is a schematic representation of the tool being disassembled after formation of the variable discharge valve.

After sub-step ii), the method further comprises a sub-step iii) consisting of removing the other first parts 54 from the body 50. In step d), the method comprises a sub-step j) consisting of removing the second central key 63 from the arm 60. This sub-step j) is in particular followed by a sub-step jj) consisting of removing the other second parts, i.e., in particular the second peripheral parts 64 of this arm 60. The second central key 63 has a particular geometry which allows it to be removed from the other four second parts 64 without difficulty, using draft angles for example.

The laps 80, 81, 82 are made in particular of carbon fiber and the resin is an epoxy or bismaleimide resin. The duct 22 may also be made from glass or aramid injected with epoxy or bismaleimide resin, and/or pre-impregnated with carbon fiber, glass or aramid.

The airtightness and the mechanical strength of the duct 22 produced using the method described in this invention are conclusive. The duct 22 remains leak-tight at a high-pressure level, in particular 2.5 bar, which is higher than the pressure level of the ducts made in the prior art. This improvement allows to redefine the thickness of the duct 22, in order to reduce the weight or optimize this duct 22.

The tool 30 and the method according to the present invention thus allow in particular to facilitate demolding and handling and to reduce mass (in particular by using hollow parts of the tool 30).

In addition, the tool 30 and the method according to the invention also allow the tool 30 to be held securely during the manufacture of the duct 22, thus allowing to improve and comply with geometric tolerances and material health, and in particular to improve the internal surface of the duct 22 (tubular portion 24 and bypass 28), thus improving the aerodynamics of the contact surfaces with the internal flow of engine air and avoiding an additional intervention to rectify the internal surface of the duct 22.

The material health is also improved by the ease of draping, by the absence of significant clearance between the first and the second parts of the tool, and also by the application of the pressure from the outside using a vacuum bag, adjusted as closely as possible to the shape of the part.

The invention thus allows to reduce the number of derogations and to reduce the manufacturing costs of the duct 22, in particular because the tool requires less material to be manufactured and is simpler to use, in particular from the point of view of mounting, cleaning and repairs.

The invention thus offers numerous advantages and in particular:

- As the molding tool 30 is rigid, the internal surface 24' of the duct 22 will take on the appearance of the molding tool 30, guaranteeing in particular the quality of the aerodynamic surface of the internal surface 24' of the duct 22.
- As the basement 40 and the body 50 are arranged before the fiber lap 80, 81, 82 is draped, it is not necessary to close a mold after draping as in the prior art. The molding tool 30 may not therefore move during the manufacture of the duct 22, which means in particular that the dimensional and shape constraints of the duct 22 are respected.
- As the preform is cured using an oven or an autoclave, the molding tool 30 does not comprise an integrated heating system, which results in a significant reduction in the mass of the molding tool 30 of the invention. In addition, each portion of the molding tool 30 may be hollow to further optimize its mass. The reduced mass also makes handling of the molding tool 30 much easier.
- The reduction in the mass of the molding tool 30, the position of the molding tool 30 inside the preform and the remote position of the heating system (oven or autoclave) all help to ensure a better thermal homogeneity during curing of the preform.
- Several molding tools 30 may enter an autoclave and therefore several ducts 22 may be produced simultaneously, with the same heating cycle, reducing the manufacturing times and costs.

As the body 50 comprises a plurality of separate parts 52, 62, a damaged part of the molding tool 22 may be replaced individually without having to replace the assembly of the molding tool 30.

The demolding of the molding tool 30 is simpler because a single part, the central key 53, allows to hold all the others in place.

The material health is improved by the ease of draping, by the absence of significant clearance between the portions of the mold and also by the application of the pressure from the outside using the vacuum bag, adjusted as closely as possible to the shape of the preform. For example, in the case of creating ears, it will be necessary to place a surplus of vacuum bag.

The use of this molding tool 30 meets both the need to facilitate the implementation and the need to improve the overall quality of the duct 22.

Cost savings may also be seen because the molding tool 30 requires less material to manufacture and the various parts of the molding tool 30 are easier to use, particularly in terms of mounting, cleaning, repair, etc.

The geometry of the basement 40 and of the body 50 of the molding tool 30 has been determined in order to ensure in particular:

Easy to unmold and handle;

The molding tool 30 is held securely in place during the manufacture of the duct 22 in order to comply with the geometric tolerances; and Improving the material health and the aerodynamic appearance of the internal surface 24' of the duct 22.

The invention therefore allows in particular to:

Guarantee a smooth aerodynamic surface, without disturbing the internal flow.

Guarantee a material health.

Improve the handling of the molding tool 30 as a whole and facilitate any repairs.

Facilitate the demolding.

Facilitate the implementation and the manufacture of the duct 22.

Reduce the manufacturing costs (no internal grinding of the duct 22) and reduced cost of the molding tool 30.

Control the final geometry, as the positioning of the molding tool 20 allow to guarantee the reproducibility of the shape.

This invention may be used in the field of aeronautics but also in that of composites in general, in particular in the field of injected or hollow-draped parts.

The invention claimed is:

1. A tool for molding a duct for an aircraft turbine engine, the duct being made of a fiber-based composite material and comprising a curved tubular portion, one end of which is connected to a peripheral rim, the tool comprising:
a basement with a parallelepiped shape and an upper surface of which comprises a central recessed portion and a peripheral portion configured to be covered by at least one fiber lap to form the peripheral rim of the duct,
a body having an elongated and curved shape and comprising a longitudinal end removably fitted into the central portion of the basement, the body being configured to be covered by at least one lap of fibers to produce the tubular portion of the duct, the body being produced by an assembly of first parts which are mounted to fit against one another and which comprise a first central demolding key which extends from one end of the body to the other and which is configured so as to be removed first when the body is demolded.

2. The tool as claimed in claim 1, wherein the basement is formed in one-part.

3. The tool according to claim 1, wherein the body comprises at least nine first parts which extend from one end of the body to the other and include the first central demolding key and eight first peripheral parts distributed around the first central key so that the nine first parts are arranged in three rows and three columns.

4. The tool according to claim 1, wherein the duct further comprising a bypass connected to the tubular portion, the tool further comprising an arm which projects from the body and which is configured to be covered by at least one fiber lap for producing the bypass.

5. The tool according to claim 4, wherein the arm is made by an assembly of second parts which extend from one end of the arm to the other.

6. The tool according to claim 5, wherein the assembly of second parts comprises a second central demolding key configured to be removed first when the arm is demolded.

7. A method for manufacturing a duct for an aircraft turbine engine, by means of a tool according to claim 1, the method comprising the steps of:
a) assembling said assembly of first parts to form said body and fitting a longitudinal end of this body into the central portion of said basement,
b) affixing fiber laps to the body and to the peripheral portion of the basement,
c) polymerizing a resin impregnated or injected onto the fiber laps, and
d) demolding the duct, which comprises the sub-steps of:
(i) dismantling and removing the basement from the body,
(ii) removing the first central key from the body,
(iii) removing the other first parts from the body.

8. The method according to claim 7, wherein the duct further comprising a bypass connected to the tubular portion, the tool further comprising an arm which projects from the body and which is configured to be covered by at least one fiber lap for producing the bypass, the arm being made by an assembly of second parts which extend from one end of the arm to the other, the assembly of second parts comprising a second central demolding key configured to be removed first when the arm is demolded, the method further comprising, in step b), affixing fiber laps to the arm, and, in step d), sub-steps of j) removing the second central key from the arm and jj) removing the other second parts from this arm.

9. The method according to claim 7, further comprising, in step c), compressing the fiber laps on the tool by means of a partial vacuum produced between the tool and a vacuum bag which covers the fiber laps and the tool.

10. The method according to claim 7, wherein the laps are made of carbon fibers and the resin is an epoxy or bismaleimide resin.

* * * * *